April 7, 1959
J. C. HESSON
2,880,594
METHOD OF AND APPARATUS FOR STORING AND
DISPENSING LIQUID CARBON DIOXIDE
Filed May 10, 1956
2 Sheets-Sheet 1
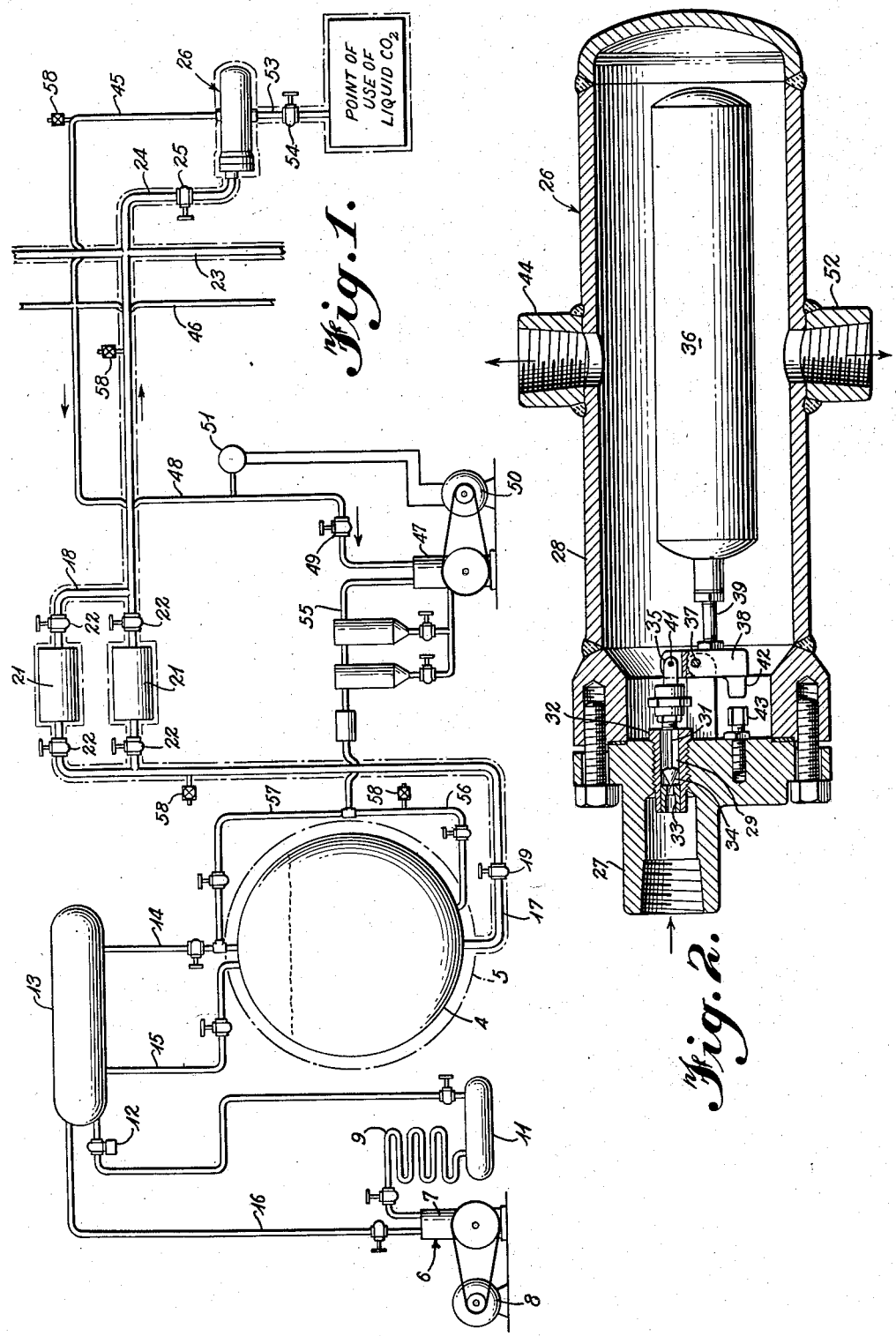

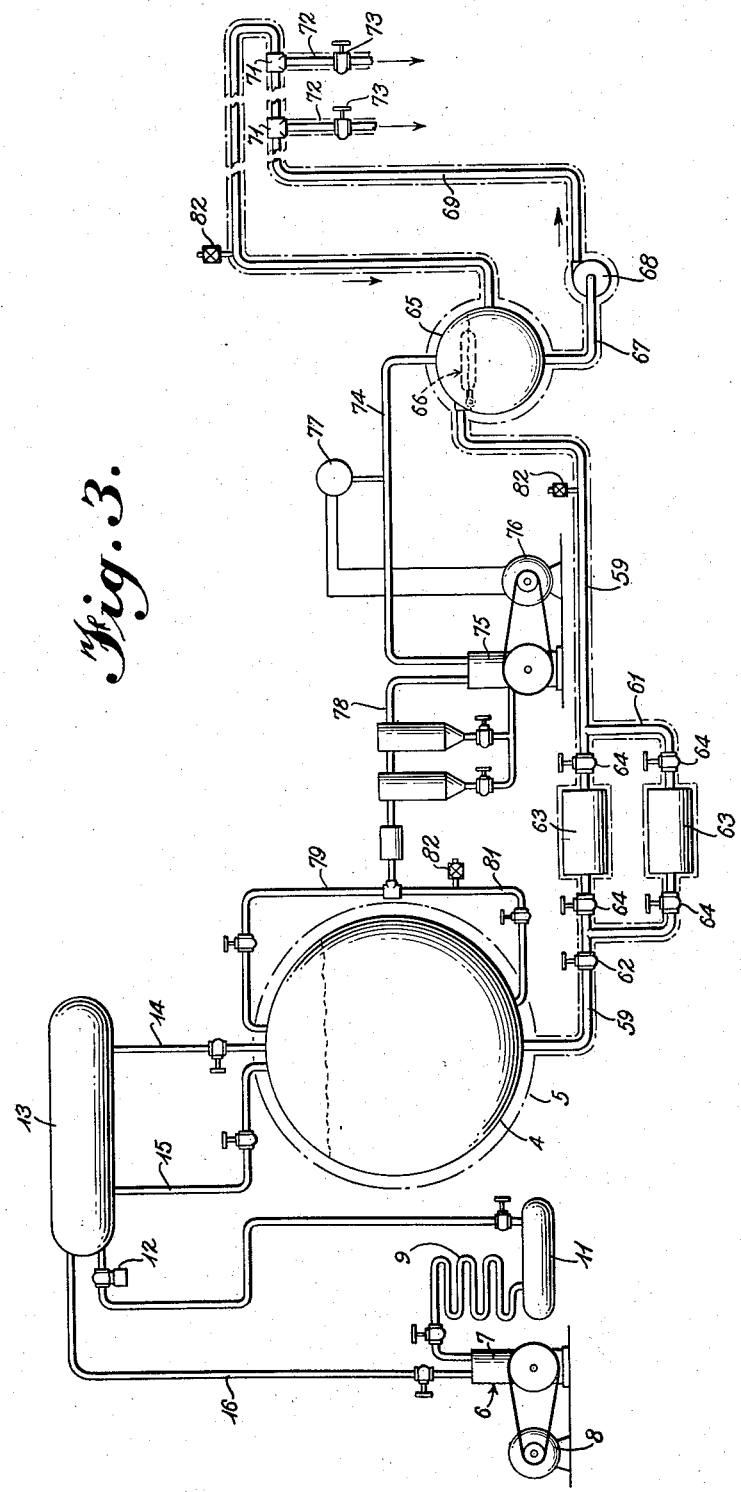

United States Patent Office 2,880,594
Patented Apr. 7, 1959

2,880,594

METHOD OF AND APPARATUS FOR STORING AND DISPENSING LIQUID CARBON DIOXIDE

James C. Hesson, Riverdale, Ill., assignor, by mesne assignments, to Chemetron Corporation, Chicago, Ill., a corporation of Delaware Application May 10, 1956, Serial No. 584,107

5 Claims. (Cl. 62—54)

This invention relates to new and useful improvements in methods of and apparatus for storing and distributing liquid carbon dioxide, and deals more particularly with systems in which liquid carbon dioxide is delivered for use at a temperature and a corresponding vapor pressure substantially below the temperature and vapor pressure at which the liquid is stored, and the vapor that is formed during delivery is returned to storage and reliquefied.

The use of liquid carbon dioxide as a refrigerating medium for very low temperature refrigeration of cold test boxes, tumbling drums for removing flash material from articles of molded rubber or the like, and similar purposes, is becoming increasingly important in modern industry. The cost of the liquid carbon dioxide, however, requires that the greatest possible amount of refrigeration effect be extracted therefrom at its point of use. For example, systems have been devised for separating the carbon dioxide vapor, which is unavoidably formed during delivery of the liquid carbon dioxide to a point of use and which has very little refrigeration effect, from the liquid at the point of use and for returning the vapor to storage where it is reliquefied.

Additional refrigeration effect is obtainable, of course, by reducing the temperature and the corresponding vapor pressure of the liquid carbon dioxide delivered to a point of use. In other words, the refrigeration effect increases as the temperature of the delivered liquid is reduced.

Additional problems are created, however, by a reduction in the temperature and corresponding vapor pressure of stored liquid carbon dioxide below values of approximately 2° F. and 300 pounds per square inch, gauge.

For example, the safe storage of liquid carbon dioxide at a temperature of −20° F. and a corresponding vapor pressure of 200 pounds per square inch, gauge requires a pressure vessel that is formed of special nickel alloy steels and incorporates certain construction details so that the cost of the vessel is approximately twice that of a vessel required for storage at a temperature of 2° F. and a pressure of 300 pounds per square inch, gauge.

Further, the mechanical refrigeration of liquid carbon dioxide in a storage vessel to maintain the temperature of the liquid at a value of −20° F., with an ambient temperature of 80° F., creates an increase in the refrigeration load of about 25 percent over that required to maintain a storage temperature of 2° F. In addition to this increase in refrigeration load, the efficiency of mechanical refrigeration systems is ordinarily reduced by a substantial amount when the evaporating temperature of the system is reduced by a relatively small amount in the lower temperature range.

An additional problem is encountered in the delivery of liquid carbon dioxide to storage vessels in which the liquid is maintained at a vapor pressure of 200 pounds per square inch, gauge or less. If the pressure of the liquid carbon dioxide delivered to storage is higher than the normal storage pressure, the system for refrigerating the liquid may be seriously overloaded and the storage pressure may be higher than normal for a considerable period of time. On the other hand, the delivery of liquid carbon dioxide by tank trucks may take up to two days and the delivery by railway tank cars may take up to six days so that the charging pressure of the delivery vehicle must be substantially below that of the storage vessel to which the liquid is to be delivered to insure delivery of the liquid at a pressure below the storage pressure. A very low charging vapor pressure and correspondingly low temperature, however, would require the delivery vehicles to be constructed of special nickel alloy steels and to incorporate certain structural details which would greatly increase the cost of the vehicles.

It is the primary object of this invention to provide an improved method of and apparatus for delivering liquid carbon dioxide stored at a given temperature and vapor pressure to a point of use at a lower temperature and pressure, and for recovering the vapor that is formed by the reduction in the temperature and vapor pressure of the liquid.

A further important object of the invention is to provide a method of and apparatus for delivering liquid carbon dioxide from storage to a point of use in such a manner that the refrigerating potential of the delivered liquid is greater than that of the stored liquid.

Another object of the invention is to provide a method of and apparatus for vaporizing a portion of a quantity of liquid carbon dioxide that is flowing from storage to a point of use to lower the temperature and vapor pressure of the delivered liquid, and for returning the vaporized carbon dioxide to storage for reliquefaction at a higher temperature and pressure.

Still another object of the invention is to provide a method of and apparatus for storing liquid carbon dioxide at a temperature and vapor pressure at which the storage vessel and the equipment for supplying liquid thereto may be of conventional construction and adapted for use in connection with liquid carbon dioxide at a pressure of about 300 pounds per square inch, gauge and a corresponding temperature of about 2° F., and for delivering the liquid carbon dioxide to a point of use at a vapor pressure and corresponding temperature substantially below that for which the vessel is constructed.

Other objects and advantages of the invention will be apparent during the course of the following description.

In the accompanying drawings forming a part of this specification and in which like reference characters are employed to designate like parts throughout the same, Figure 1 is a schematic view of a liquid carbon dioxide storage and delivery system embodying the invention, Figure 2 is a longitudinal sectional view of the float operated valve employed in the system of Fig. 1, and Figure 3 is a schematic view of a liquid carbon dioxide storage and delivery system embodying a modified form of the invention.

In the drawings, wherein for the purpose of illustration are shown the preferred embodiments of this invention, and first particularly referring to Fig. 1, reference character 4 designates a supply or storage vessel covered by suitable insulating material 5. The vessel 4 is charged with liquid carbon dioxide in any suitable manner and the temperature of the liquid is maintained at approximately 2° F. by a conventional mechanical refrigeration system designated in its entirety by the reference character 6. At this temperature, the vapor pressure of the liquid carbon dioxide in the storage vessel 4 will be maintained at approximately 300 pounds per square inch, gauge.

The mechanical refrigeration system 6 includes a compressor 7 driven by a motor 8 for compressing the refrigerant which flows from the compressor through the condensing coils 9 into a receiver 11. From the receiver 11, the refrigerant flows through an expansion valve 12 into a series of evaporating coils, not shown, which are mounted within the chamber 13 in heat exchange relationship with carbon dioxide vapor which is admitted to the chamber from the storage vessel 4 through a pipe 14. As the carbon dioxide vapor within the chamber 13 is liquefied by its contact with the cold evaporator coils within the chamber, the liquid will be returned to the storage vessel 4 through the liquid return pipe 15. The refrigerant, upon leaving the evaporator coils in the chamber 13, is returned to the compressor 7 through a pipe 16.

Leading from the bottom of the storage vessel 4 is an insulated liquid carbon dioxide delivery pipe 17, one portion of which has connected in parallel relationship therewith an insulated by-pass pipe 18 providing separate branch passageways. A manually operated shut-off valve 19 is mounted in the pipe 17 to permit control of the flow of liquid carbon dioxide to either of the branch passageways provided by the pipe 17 and by-pass 18. Each of the branch passageways is provided with a drying chamber 21 having valves 22 mounted on opposite sides thereof so that either of the drying chambers can be completely isolated from the liquid flow. Either of the drying chambers 21, therefore, can be supplied with a drying medium or have its supply of drying medium replaced while liquid carbon dioxide continues to flow through the other drying chamber.

Liquid carbon dioxide flowing through the pipe 17 is delivered to an insulated liquid header 23 and, near each point of use of the liquid, a separate, insulated branch pipe 24 extends from the header through a manually operted shut-off valve 25 to a float valve assembly 26. Of course, if the liquid carbon dioxide is to be delivered to a single point of use, the header 23 may be dispensed with and the supply pipe 17 may be connected directly to the float valve assembly 26.

Referring now to Fig. 2 for a detail description of the float valve assembly 26, the liquid carbon dioxide flowing through the branch pipe 24 enters the float valve assembly through a port 27 at one end of the float chamber 28 in accordance with the position of a float operated valve 29 which is arranged between the float chamber and the inlet port. The valve 29 is provided with circumferentially spaced splines 31 which slidably engage the bore of the valve guide 32 to limit movement of the valve to an axial direction. At the outer end of the valve 29 there is provided an apertured valve seat 33 and the valve is provided with a conical seating surface 34 which is movable into engagement with the valve seat to close the aperture through the latter. Movement of the valve 29 away from the valve seat 33, on the other hand, will open the aperture through the valve seat so that liquid will flow through the valve seat aperture and between the splines 31 into the chamber 28. At the inner end of the valve 29 there is provided an operating stem 35 which is threadedly connected to the valve.

Axial movement is imparted to the valve 29 to control the flow of liquid from the pipe 24 into the chamber 28 by an elongated float 36 which is positioned in the chamber 28 and is mounted for pivotal movement about a fixed pin 37 which passes through the block 38 that is rigidly connected to the float stem 39. One end portion of the block 38 is pivotally connected to the valve stem 35 by a pin 41 and the opposite end portion is provided with a lug 42 for engaging the adjustable stop 43 to limit the pivotal movement of the block about the pin 37. Of course, some lost motion must be provided at the pin 41 to permit pivotal movement of the block 38 to effect the straight line movement of the valve 29 in its guide 32.

It will be readily apparent that the float 36 will be raised and lowered in accordance with the level of the liquid in the chamber 28 and such movement of the float will effect pivotal movement of the rigidly connected block 38 about the pin 37 to open and close the valve 29. In other words, as the level of the liquid carbon dioxide in the chamber 28 rises, the float 36 will be moved upwardly to effect pivotal movement of the block 38 in a counterclockwise direction, as viewed in Fig. 2, to cause the valve 29 to close. The flow of liquid from the pipe 24 will thereupon stop until the level of the liquid is lowered to a sufficient extent to open the valve 29. It will be noted at this time that, since the size of the aperture of the valve seat 33 is very small, the closing force exerted on the valve 29 by the block 38, due to the buoyancy of the float 36, does not need to be particularly great to overcome or counteract a substantial pressure differential between the liquid in the float chamber 28 and in the pipe 24.

A vapor release port 44 is provided in the upper portion of the chamber 28 for connection to a branch return pipe 45, as illustrated in Fig. 1. This branch return pipe 45 is connected to a vapor header 46 which is in turn connected to the inlet of the compressor through a return pipe 48 provided with a manually operated shut-off valve 49. The compressor 47 is driven by a motor 50, the operation of which is controlled by a pressure responsive switch device 51 in open communication with the pipe 48. In other words, when the pressure of the vapor in the pipe 48 exceeds a certain preselected value, the motor 50 is energized to drive the compressor 47 and withdraw vapor from the chamber 28 through the pipe 45, the header 46 and pipe 48. In this manner, the vapor pressure within the chamber 28 may be maintained at a value substantially below that within the storage vessel 4. The chamber 28, therefore, functions as a secondary vessel for receiving liquid carbon dioxide from the storage vessel 4 at a vapor pressure and a corresponding temperature substantially below that of the liquid carbon dioxide in the storage vessel.

At the bottom of the chamber 28 there is provided a liquid discharge port 52, as illustrated in Fig. 2, through which liquid is free to flow through the pipe 53 directly to the adjacent point of use for the liquid carbon dioxide. A manually operated shut-off valve 54 is provided for controlling the flow of liquid through the pipe 53.

The carbon dioxide vapor withdrawn from the chamber 28 by the compressor 47 is compressed to a pressure equal to or greater than the vapor pressure of the liquid carbon dioxide in the storage vessel 4. This compressed vapor, therefore, will flow through the outlet pipe 55 and the selected one of the separate branch pipes 56 and 57 depending on whether the vapor is to be delivered to the bottom or the top of the storage vessel 4. In either event, the carbon dioxide vapor which is delivered to the storage vessel 4 will be liquefied by the mechanical refrigeration system 6.

If liquid carbon dioxide is supplied to more than one point of use, a branch return pipe 45 is provided to connect the float valve assembly adjacent each additional point of use to the vapor header 46 for return of the vapor to the compressor 47 as described above.

Pressure relief valves 58 are provided at various points throughout the system to prevent excessive pressures on any portion of the system due to vaporization of liquid that might be trapped between manually operated valves.

Reference is now made to Fig. 1 for a detail description of the manner in which this system operates to increase the refrigeration effect of the liquid carbon dioxide stored in the vessel 4. It will first be noted that liquid carbon dioxide stored in a conventional storage vessel at a vapor pressure of approximately 300 pounds per square inch, gauge and a corresponding temperature of approximately 2° F. will have a refrigeration effect of about 113.5 B.t.u.'s per pound when released at atmospheric pressure.

The liquid carbon dioxide flowing from the storage vessel 4 through the delivery pipe 17 and through one or another of the drying chambers 21, however, will enter a secondary vessel or chamber 28 where its pressure is reduced in accordance with the setting of the pressure operated switch 51. The vapor pressure of the liquid carbon dioxide in the chamber 28, for example, may be reduced to 200 pounds per square inch, gauge, at which the corresponding temperature of the liquid will be —20° F. The carbon dioxide vapor that is formed by this reduction in the pressure on the liquid will be withdrawn from the chamber 28 by the compressor 47 at a rate to maintain the selected lower temperature and pressure conditions within the chamber 28.

When liquid carbon dioxide is released to the atmosphere from storage at 200 pounds per square inch, gauge, the refrigeration effect of the liquid is about 124.2 B.t.u.'s per pound or 10.7 B.t.u.'s per pound greater than the refrigeration effect of liquid carbon dioxide released from storage at 300 pounds per square inch, gauge. Further, adjustment of the pressure operated switch 51 to cause operation of the compressor 47 to maintain the pressure in the chamber 28 at a lower value of, for example, 150 pounds per square inch, gauge, will increase the refrigeration effect of the liquid carbon dioxide that is delivered from the chamber 28 to a point of use to a value of 130.6 B.t.u.'s per pound or 17.1 B.t.u.'s per pound greater than the refrigeration effect of liquid carbon dioxide released from storage at 300 pounds per square inch, gauge.

As a practical limitation on the extent to which the vapor pressure of the liquid carbon dioxide may be reduced in the chamber 28, it will be noted that the drop in pressure of the liquid flowing past the valve 29 increases in direct relationship with the reduction in the pressure within the chamber 28 so that the portion of the liquid which flashes to vapor as the liquid passes the valve 29 increases as the pressure in the chamber is reduced. In other words, a greater amount of vapor must be withdrawn from the chamber 28 to further reduce the pressure therein and the compressor 47 must have a higher capacity and will require a greater power input from the motor 50 for each reduction in the pressure of the liquid in the chamber.

The carbon dioxide vapor withdrawn from the chamber 28 by the compressor 47 is compressed and will flow through the pipe 55 for return to the storage vessel 4 through either of the branch pipes 56 or 57. The refrigeration system 6 associated with the storage vessel 4, however, is designed to provide sufficient refrigeration to reliquefy this recycled vapor and to maintain the liquid in the storage vessel at the desired storage pressure and temperature.

In connection with the examples cited above, it might be further noted that the A.S.M.E. Unfired Pressure Vessel Code, in accordance with which liquid carbon dioxide storage vessels are built, permits the use of standard types of steel and construction for the storage of liquid carbon dioxide at vapor pressures which correspond with temperatures down to —20° F. For storage at vapor pressures which correspond with temperatures below —20° F., however, special nickel alloy steels are required to meet specified impact tests and, in addition, some construction details are more specialized. In order to employ conventional storage vessels, therefore, the liquid carbon dioxide must be stored at a temperature above —20° F. and the corresponding vapor pressure of 200 pounds per square inch, gauge. Further, at vapor pressures between 200 and 300 pounds per square inch, gauge and the corresponding temperatures of —20° F. to 2° F., special care is required to prevent accidental lowering of the storage temperature below the —20° F. critical limit. Therefore, the vehicles employed for delivering liquid carbon dioxide to storage vessels must be of a special construction if the vehicles are to be charged at a vapor pressure sufficiently below the storage vessel pressure to permit transportation of the liquid to the points of delivery without a substantial loss of carbon dioxide due to venting through pressure relief valves, or without an increase in the delivery pressure to a value substantially above the storage pressure.

Referring now to Fig. 3 for a detail description of the modification of the invention illustrated therein, it will be noted that the storage vessel and its associated mechanical refrigeration system are identical to those illustrated in Fig. 1 and corresponding reference characters have been applied to corresponding parts thereof. Leading from the bottom of the storage vessel 4 is a delivery pipe 59 having connected thereto a by-pass pipe 61 which provides an alternate flow path. A manually operated shut-off valve 62 is provided for the pipe 59 adjacent the vessel 4 and a pair of drying chambers 63 are mounted in the pipe 59 and the by-pass pipe 61. Manually operated valves 64 are provided adjacent each side of each chamber 63 so that either of the chambers can be isolated from the flow of liquid carbon dioxide. This arrangement of the drying chambers 63 permits the replenishment of the drying medium in either chamber without interrupting the delivery of liquid carbon dioxide through the pipe 59.

The liquid carbon dioxide flowing through the pipe 59 is delivered to the upper portion of an insulated secondary vessel 65 and is controlled by a float operated valve assembly 66. This valve assembly includes a valve and a float which are identical to the valve 29 and float 36 illustrated in Fig. 2 and will not again be described.

An insulated pipe 67 leads from the bottom of the secondary vessel 65 to the inlet of a pump 68 and the outlet of the pump is connected to an insulated pipe 69 which forms a closed loop to return the liquid carbon dioxide to the secondary vessel 65. At spaced points along the loop formed by the pipe 69 and adjacent each point of use for the liquid carbon dioxide, there is provided a T-coupling 71 from which a branch pipe 72 extends downwardly through a manually operated valve 73 directly to the associated point of use.

The upper portion of the secondary vessel 65 has connected thereto a vapor return pipe 74 which leads to the inlet of a compressor 75 driven by the motor 76, the operation of which is controlled by a pressure responsive switch 77 which is in open communication with the pipe 74. The switch 77, therefore, may be adjusted to cause the compressor 75 to be operated in such a manner as to maintain the pressure within the secondary vessel 65 at a selected value below the storage pressure of the liquid carbon dioxide. The outlet of the compressor 75 is connected through a vapor return line 78 and through the two alternately used branch lines 79 and 81 to the upper or lower portions, respectively, of the storage vessel 4, so that the vapor leaving the compressor will re-enter the storage vessel and will be reliquefied by the mechanical refrigeration system 6 associated therewith.

Pressure relief valves 82 are provided at variously located points in the above described system to prevent the accumulation of an excessive pressure in those portions of the system which may be isolated from the storage receptacle 4 by operation of the manually operated shut-off valves which are employed in the system.

The operation of the system operated in Fig. 3 is best illustrated by the following example:

Liquid carbon dioxide is stored within the vessel 4 at a maintained vapor pressure of approximately 300 pounds per square inch, gauge, and the corresponding temperature of 2° F. by the mechanical refrigeration system 6. The liquid carbon dioxide withdrawn from the storage vessel 4 flows alternately through one or another of the drying chambers 63, where any moisture is removed, and is delivered to the secondary vessel 65 in accordance with the operation of the float valve assembly 66. The secondary vessel 65 is substantially smaller than the storage vessel 4 and the level of the liquid carbon dioxide therein is maintained at a substantially constant point by operation of the float valve assembly 66. Carbon dioxide vapor is withdrawn from the upper portion of the secondary vessel 65 in accordance with the operation of the compressor 75 to maintain the vapor pressure within the secondary vessel at a selected value substantially below that prevailing in the storage vessel 4. This withdrawn vapor is compressed by the compressor 75 and returned through the vapor return pipe 78 and alternately through the branch pipes 79 or 81 to the storage vessel 4 where it is reliquefied.

By way of example only, the pressure responsive switch 77 may be adjusted to cause the motor 76 to operate the compressor 75 when the pressure within the secondary vessel 65 exceeds 150 pounds per square inch, gauge. The vapor pressure within the secondary vessel 65, therefore, will be maintained at a value of 150 pounds per square inch, gauge and the temperature of the liquid carbon dioxide therein will be at the corresponding value of −34° F.

The low temperature liquid in the secondary vessel 65 is withdrawn through the pipe 67 by the pump 68 and is circulated through the closed loop formed by the pipe 69 from which portions of the liquid are withdrawn through the branch pipes 72 as required at the various points of use of liquid. The portion of the liquid circulating through the pipe 69 which is not withdrawn through the branch pipes 72 is returned to the secondary vessel 65 for recirculation by the pump 68.

It is to be understood that I do not desire to be limited to the exact order of method steps as they have been disclosed, for variations and modifications of the same, which fall within the scope of the accompanying claims, are contemplated. It further is to be understood that the particular types of apparatus herein shown and described are to be taken as preferred examples of the invention, and that various changes in the shape, size, and arrangement of parts may be resorted to without departing from the spirit of the invention or the scope of the subjoined claims.

Having thus described the invention, I claim:

1. A method for storing liquid carbon dioxide and delivering the same to a point of discharge, comprising refrigerating the stored liquid carbon dioxide to maintain it at a desired temperature and corresponding vapor pressure, flowing controlled quantities of the stored liquid to an intermediate zone, withdrawing carbon dioxide vapor from said intermediate zone to lower the temperature and vapor pressure of the liquid carbon dioxide therein, compressing said withdrawn vapor, returning the compressed vapor to said storage zone for reliquefaction, and delivering the liquid carbon dioxide at said lower temperature and vapor pressure from said intermediate zone to said point of discharge.

2. A method for storing liquid carbon dioxide and delivering the same to a point of discharge, comprising refrigerating the stored liquid carbon dioxide to maintain it at a desired temperature and corresponding vapor pressure, flowing liquid carbon dioxide from storage to an intermediate zone, controlling the flow of liquid carbon dioxide to said intermediate zone in accordance with the quantity of liquid in this zone, withdrawing carbon dioxide vapor from said intermediate zone in accordance with the pressure therein to maintain the vapor pressure and temperature of the liquid in the intermediate zone at values below said desired storage pressure and temperature, compressing said withdrawn vapor, returning the compressed vapor to said storage zone for reliquefaction, and delivering liquid carbon dioxide at said lower temperature and vapor pressure from said intermediate zone to said point of discharge.

3. A method for storing liquid carbon dioxide and delivering the same to a point of discharge, comprising refrigerating the stored liquid carbon dioxide to maintain it at a desired temperature and corresponding vapor pressure, flowing liquid carbon dioxide from storage to an intermediate zone, controlling the flow of liquid carbon dioxide to said intermediate zone in accordance with the quantity of liquid in this zone, withdrawing carbon dioxide vapor from said intermediate zone in accordance with the vapor pressure therein to maintain the vapor pressure and temperature of the liquid in the intermediate zone at values below said desired storage pressure and temperature, compressing said withdrawn vapor, returning the compressed vapor to said storage zone for reliquefaction, and pumping liquid carbon dioxide at said lower temperature and vapor pressure from said intermediate chamber to the point of discharge.

4. Apparatus for storing and dispensing liquid carbon dioxide, comprising an insulated refrigerated vessel for storing liquid carbon dioxide therein at a desired temperature and corresponding vapor pressure, an insulated secondary vessel, an insulated conduit for flowing liquid carbon dioxide from said storage vessel to said secondary vessel, valve means connected in series with said conduit for controlling the flow of liquid through said conduit in response to variations in the level of the liquid in said secondary vessel, means for withdrawing carbon dioxide vapor from said secondary vessel, means for compressing the withdrawn vapor to a pressure higher than said desired storage pressure and returning the compressed vapor to said storage vessel for reliquefaction, means for controlling said compressing means in response to a condition of the carbon dioxide in said secondary vessel so that the carbon dioxide in said vessel is maintained at a temperature and vapor pressure below said desired storage temperature and pressure, and means for delivering liquid carbon dioxide at said lower temperature and vapor pressure from said secondary vessel to a point of discharge.

5. Apparatus for storing and dispensing liquid carbon dioxide as defined in claim 4 further characterized by said means for controlling said compressing means being a pressure sensitive switch adapted for actuation by the vapor pressure existing in said secondary vessel.

References Cited in the file of this patent

UNITED STATES PATENTS

| | | |
|---|---|---|
| 1,718,312 | Shipley | June 25, 1929 |
| 1,933,257 | Gossman | Oct. 31, 1933 |
| 2,021,394 | Wade | Nov. 19, 1935 |
| 2,047,099 | Goosman | July 7, 1936 |
| 2,192,368 | Ray | Mar. 5, 1940 |
| 2,291,678 | Benz et al. | Aug. 4, 1942 |
| 2,387,894 | Fannin | Oct. 30, 1945 |
| 2,496,185 | Voss et al. | Jan. 31, 1950 |
| 2,670,605 | Van Zandt | Mar. 2, 1954 |